United States Patent [19]

Marencak et al.

[11] 4,300,957
[45] * Nov. 17, 1981

[54] VAPOR TREATMENT OF METAL TIRE CORD

[75] Inventors: Karol Marencak, Bissen, Luxembourg; Grover W. Rye, Cuyahoga Falls, Ohio

[73] Assignee: The Goodyear Tire & Rubber Company, Akron, Ohio

[ * ] Notice: The portion of the term of this patent subsequent to Feb. 19, 1997, has been disclaimed.

[21] Appl. No.: 103,242

[22] Filed: Dec. 13, 1979

Related U.S. Application Data

[60] Division of Ser. No. 950,333, Oct. 10, 1978, Pat. No. 4,189,332, which is a continuation of Ser. No. 644,673, Dec. 29, 1975, abandoned.

[51] Int. Cl.³ ............................................. C23F 7/00
[52] U.S. Cl. .............................. 148/6.31; 156/110 C; 156/124; 427/255.6; 428/381; 428/382
[58] Field of Search ..................... 148/6.31, 6.14 R; 156/110 C, 124; 427/248 H, 248 G, 431, 255.6; 428/381, 382, 389, 390

[56] References Cited

U.S. PATENT DOCUMENTS

| | | | |
|---|---|---|---|
| 2,468,239 | 4/1969 | Saulino | 427/378 |
| 3,597,353 | 8/1971 | Randell et al. | 252/542 |
| 3,846,160 | 11/1974 | Hirakawa et al. | 156/124 |
| 4,189,332 | 2/1980 | Rye et al. | 148/6.31 |

FOREIGN PATENT DOCUMENTS

| | | | |
|---|---|---|---|
| 246709 | 9/1963 | Australia | 427/248 H |
| 933979 | 8/1963 | United Kingdom | 148/6.31 |

*Primary Examiner*—Ralph S. Kendall
*Attorney, Agent, or Firm*—H. C. Young, Jr.

[57] ABSTRACT

Brass coated steel tire cord is treated with vaporized benzotriazole and/or other treatment agents to promote corrosion resistance and cord to rubber adhesion retention.

2 Claims, No Drawings

VAPOR TREATMENT OF METAL TIRE CORD

This is a division of application Ser. No. 950,333 filed Oct. 10, 1978, now U.S. Pat. No. 4,189,332, which was a continuation of application Ser. No. 644,673, filed Dec. 29, 1975, abandoned.

This invention relates to the treatment of brass coated steel cord to prevent corrosion of the cord and to improve cord/rubber adhesion retention.

Pneumatic vehicle tires are often reinforced by means of cords prepared from brass coated steel filaments. This tire cord is frequently high carbon steel or high carbon steel cord with a thin layer of alpha brass. The cord may be a monofilament, but normally is prepared from several filaments which are stranded together. The filament is coated with brass, cold drawn and then stranded to form the cord. In most instances, normally depending upon the type of tire being reinforced, the strands of filaments are further cabled to form the final cord.

Brass plated steel wire tire cords are subject to corrosion of the steel structure and oxidation of the brass plating if improperly handled prior to incorporation into a tire. Corrosion and oxidation can result in poor adhesion between the cord and rubber and more importantly in a deterioration of the physical properties of the cord.

Various chemical reagents such as benzotriazole (BTA) have been proposed to protect such wire against corrosion and oxidation. Such reagents are described in copending applications. These reagents normally have been applied by immersing the wire in a water solution of the reagent. The wire is then dried to remove the water. The reagents react with wire to offer it protection against oxidation and/or corrosion. For example, BTA reacts with the copper to form a polymer layer. This layer must be sufficiently thin to allow a sulfur/copper bond to be formed between the wire and the adjacent rubber within the tire, and yet the film must be of such a continuous uniformity as to facilitate resistance to corrosion.

Water application of reagents such as BTA requires lengthy immersion and drying times which can be expensive in commercial operations. The poor wetability of metal cord contributes to the length of the immersion time. The porosity of the brass coating presents the possiblity that water may be occluded and therefore difficult to remove by drying. There is also the possibility that it will be difficult for the water to penetrate the porous openings because of surface tension effects. Where the tire filament is freshly drawn, the filament is cooled by the water immersion thereby requiring expensive reheating of the cord both to dry the cord and to promote the reaction between the reagents and the cord. It is therefore necesssary that a method be found which does not require the use of expensive equipment and which permits the rapid treatment of the cord.

It is an object of the present invention to provide an efficient, low cost method of applying protective agents to brass coated steel wire, said method being capable of rapidly treating the wire and reaching even remote surfaces of the wire. It is also an object of the present invention to provide a method which will not require the use of drying equipment or other expensive and time consuming follow-up treatments. It is still another object of the present invention to provide treated brass coated steel tire cord possessing effective corrosion resistance.

The objects of the present invention can be accomplished by treating the cord during the course of its preparation or thereafter with reagents capable of promoting and/or retaining adhesion between the metal cord and adjacent vulcanized rubber and/or capable of improving the resistance of the cord to corrosion prior to incorporation into the tire during and after incorporation into the tire, said reagent being in a gaseous state, either saturated or unsaturated. Said reagents include compounds capable of preventing the oxidation of the steel substrate and/or capable of preventing the corrosion of the brass.

The process of the present invention can be used to treat the filament after drawing but before stranding, after stranding to form the cord, in the form of woven fabric or as multiple ends such as may be used at a creel calendering operation. In fact, the method can be used at any point in the manufacture of the cord and even subsequent thereto, the only requirement being that the cord be treated at some point before it becomes a reinforcing element in the tire or other rubber product.

Any reagent which can be vaporized can be used within the practice of the present invention including, but not limited to, reagents selected from the group consisting of precipitation compounds, oxidizing compounds, and compounds having the following structural formula

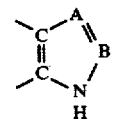

wherein the adjacent carbon atoms are joined to form a benzene or naphthylene ring, said ring being substituted (for example, with a single methyl group) or unsubstituted and wherein A and B are selected from the group consisting of —N— or —CH—, with the proviso that A and B are never both —CH—, said agent being in the form of a gas. The precipitation compounds include compounds selected from the group consisting of organic borates, organic phosphate and organic metaphosphates. The oxidation compounds include organic nitrites.

The precipitation compounds offer their protection through an indirect oxidizing (buffering) mechanism. The oxidation compounds offer protection by directly oxidizing metallic ions in the substrate surface.

Examples of organic compounds which can be used in the practice of the present invention include organic alkyl, cycloalkyl and aryl derivatives of m-boric acid, o-boric acid and pyro-boric acid as well as m-, o-, pyro- and hypo-phosphoric acid.

Preferably the vapor contains some moisture since water enhances the ability of the agents to prevent corrosion and to provide improved aged adhesion, that is, to retain to some measure the original adhesion. Said moisture can be introduced, for example, by introducing steam into the gaseous atmosphere in a catalytic amount. Another embodiment involves exposing the cord to an atmosphere having a high moisture content subsequent to the vapor treatment.

The vapor technique has the advantage of permitting the reagent to reach the furthest recesses of the stranded cord even when wrapped upon a spool. It also permits the reagent to enter the microscopic pores of the brass coating.

Any manner of exposing the cord to the vapors will result in some improvement in corrosion or oxidation resistance.

The cord can be treated while at room temperature or after being heated. For example, a filament or a cord can be preheated to a temperature higher than the temperature of the vapor to which it is exposed, for the time necessary to provide the required degree of reaction. This results in a reaction in the gaseous phase only, and therefore the only reactive material deposited is that which reacts with the available copper or steel on the wire surface. It is theorized that monomolecular films may be deposited in this fashion. The resulting thin films thereby create a minimum amount of interference with the sulfur reaction required for bonding the wire to rubber.

Concentration of the vapor, temperature of the vapor, and temperature of the wire determine the time required for the reactions to occur. Optimum conditions can be routinely determined for each system.

In one embodiment of the present invention, a wire or cable with a temperature below the temperature of the vapor is passed through the chamber, and the reagent is condensed on the surface of the wire reacting simultaneously therewith. The amount deposited will depend upon the vapor concentration, vapor temperature, time exposed and the incoming and exiting temperatures of the wire. Again, optimum conditions can be routinely determined. This wire can be used as treated or subsequently heated to vaporize excess reactants and/or to continue the reaction between the reagent and the cord to the desired state of completion, if the desired state has not already been reached.

The agents can be used alone or in combination. Likewise a series of units can be used, each containing a different agent. It is preferred that one stage of the treatment involve the use of a BTA-type chemical agent. If the agents are to be used in combination, one must naturally consider vapor pressure effects, miscibility effects, potential interaction between the agents in liquid or vapor form at the temperatures being used, etc. None of these remarks are intended to be limitations upon the process of the present invention but are intended only to be used as guidelines.

The brass coated steel cord which can benefit by the practice of the present invention includes cord treated by methods or with material other than described herein, but which are still subceptible to oxidation and/or corrosion.

If moisture is desired, it can be introduced, for example, by the introduction of steam into the reaction area, the addition of water to the molten agents, etc. The manner by which the water is introduced is not critical.

There is no reason why the present method can not be combined with other methods. For example, the wire can be first treated in an aqueous solution of one reagent followed by treatment with the BTA type material in vapor form.

In selecting agents, order of treatment, etc., one should consider that film formation with compounds such as BTA can possibly cover the exposed steel so as to minimize contact thereof with other agents.

It is believed that a reduction of the porosity, for example by film formation on the cord surface, may result in improved corrosion resistance and adhesion retention.

As a guideline, but not a limitation, one can measure the porosity of the wire by immersing it in a potassium ferrocyanide solution. The darker the resulting cord, the greater its porosity. In this way the degree of porosity can be estimated before, during, and after treatment.

It should be noted that the vapor phase need not be formed strictly from the molten form of the agent. For example, if the agent tends to sublime, that is, passes from the solid to the gaseous stage without passing through the liquid stage, it can still be used in the vapor treatment method, the only critical factor of said method being that the wire is exposed to the vapor of the agent. Likewise, whether an agent that is a liquid or a solid at room temperature is not critical so long as it is contacted with the wire in its vapor state.

The brass coating of a typical brass coated steel cord is microscopically porous, thereby exposing small areas of steel surface to any surrounding environment. It is believed that BTA interacts with copper in a brass coating to form a polymeric complex of BTA plus copper. This polymeric complex is insoluble in most solvents and serves as a protective barrier to any environmental degradation of the underlying brass. On the other hand, anions from the precipitation and oxidation compounds, it is theorized, interact with iron and iron oxide from steel surfaces exposed through microscopic pores to form an adherent oxide film which protects the steel. It is not necessary that the barrier layers of polymeric complexes adsorbed be extremely thick. In fact, as mentioned earlier, such layers should not be so thick as to interfere with the sulfur reaction required for bonding the wire to the rubber, the adhesion of rubber to metal cord requiring the formation of copper-sulfur bonds.

The practice of the present invention results in increased surface protection of brass coated steel prior to rubber encapsulation and improved aged adhesion of vulcanized brass coated steel/rubber composites. It also prevents cord failure due to excessive corrosion during the use of the product, e.g., a tire being reinforced with the cord.

The rubber surrounding the metal can be any rubber, preferably diene rubbers such as natural rubber, rubbery copolymers of butadiene with styrene or acrylonitrile, polybutadiene and polyisoprene.

The fact that the adhesion between the copper in the brass and the adjacent rubber is dependent upon the presence of sulfur requires the use in the adjacent rubber of either free sulfur or a compound capable of donating sulfur such as 2-(morpholinodithio)benzothiazole.

Aged metal to rubber adhesion is particularly poor when the rubber contains oxygen, moisture, and an amine resin capable of releasing ammonia. For example, rubbers containing hexamethylenetetramine (HMTA) such as in a resorcinol/HMTA in situ resin system, where oxygen and moisture levels are sufficiently high, can tend to have poor aged-adhesion to brass or brass coated steel. The use of the present process is particularly beneficial in such systems. Further, coatings on in-process wire protect the wire from deleterious effects of moisture (humidity) and oxidation, i.e., improve factory storage life.

By the term "high-carbon" steel as used in the present specification and claims, applicant is referring to what is known as carbon steel, also called ordinary steel, also called straight carbon steel or plain carbon steel, e.g., American Iron and Steel Institute Grade 1070 high-carbon steel (AISI 1070). Such steel owes its properties chiefly to the presence of carbon without substantial amounts of other alloying elements. In this respect see Metals Handbook, The American Society for Metals, Metals Park, Cleveland, Ohio.

The term "brass" includes, but is not limited to, alpha brass or compositions in which the major component is alpha brass, i.e., which contain from about 65 to 75 percent copper and 35 to 25 percent zinc, respectively.

The following examples contain illustrations of, but do not limit the practice of the present invention.

EXAMPLE 1

A chamber 30 centimeters long was mounted at the exit of a wire drawing machine operating at a speed of 900 meters per minute.

BTA was vaporized in this chamber with the melt temperature being maintained at 120° C. Drawn filaments (brass coated steel) were passed through this chamber. Filaments treated in this manner were formed into a 5×0.25 cable.

The resulting cable was embedded in carbon black loaded polymer, and the polymer vulcanized. Corrosion resistance on the bare cable and adhesion data on the vulcanized composite were obtained. The results are listed below.

|  | Original Adhesion (kilograms) | Wet Compound Adhesion[1] (kilograms) | Corrosion Resistance |
|---|---|---|---|
| Untreated | 57.0 | 29.0 | Poor |
| Treated | 45 | 38 | Excellent |

EXAMPLE 2

A chamber 30 centimeters long and approximately 6 centimeters high was equipped with suitable heaters. BTA was melted in the bottom of this chamber and a wire cable passed through this vapor zone. Test results on cable treated in this manner were as follows.

| Sample 1 Run | Speed | Expo. Time | Melt Temp. | Orig. Adhes. | Wet Comp. Adhes.[1] | Corrosion Resistance |
|---|---|---|---|---|---|---|
| (1) | 30m/m | .6 | 180° C. | 53 | 32 | Excellent |
| (2) | 30m/m | .6 | 120° C. | 55 | 27 | Excellent |
| (3) | 90m/m | .2 | 180° C. | 54 | 28 | Excellent |
| Untreated | — | — | — | 57 | 25 | Fair |

[1]Unvulcanized rubber soaked in water before the cable was embedded therein.

EXAMPLE 3

The chamber used in Example 2 was mounted on a strander running at 90 meters per minute. Test results on cables produced when exposing the cable with the melted BTA at a temperature of 180° C. are as follows.

|  | Original Adhesion | Wet Compound Adhesion | Corrosion Resistance |
|---|---|---|---|
| Treated | 52 | 30 | Excellent |
| Untreated | 48 | 21 | Fair |

In every one of the above examples the treated cord possessed a higher wet compound adhesion and better corrosion resistance than the untreated cord.

Once the cord is plated with the brass, treatment can begin. Treatment can occur with the reagents between the plating and drawing steps or between the drawing and stranding steps and even on the final cord prior to calendering. Where the vapor treatment results in film formation, it is preferably accomplished before drawing since drawing will naturally destroy the film continuity.

Any compound could have been substituted for BTA type compounds, which complexes with the copper in the brass to form an insoluble film, i.e., insoluble in any of the environments to which the material is to be exposed. These compounds include triazoles, imidazoles and indazoles. Such compounds include those compounds conforming to the structural formula recited earlier herein.

The rubber used in the earlier described working examples was a carbon black loaded natural rubber.

Any of the previous working examples could have involved a subsequent heat treatment and/or exposure of the wire to water vapor.

Other materials which can be used, for example, to treat wire using the present method are triethyl phosphate and amyl nitrite.

While certain representative embodiments and details have been shown for the purpose of illustrating the invention, it will be apparent to those skilled in this art that various changes and modifications may be made therein without departing from the spirit or scope of the invention.

We claim:

1. A process of treating a filament of steel which comprises continually passing a steel filament having a microscopically porous brass coating thereon through the vapor of benzotriazole to form primarily a monomolecular coating thereof on said filament where said filament is at a temperature lower than the temperature of said vapor so that the vapor is condensed on the surface of the wire while interacting therewith.

2. A process of treating a stranded cord which comprises continually passing a cord of stranded steel filaments, said filaments having a microscopically porous brass coating thereon, through benzotriazole vapor to form primarily a monomolecular coating thereon, through benzotriazole vapor to form primarily a monomolecular coating thereof on the filaments of said cord, where said cord is at a temperature lower than the temperature of said vapor so that the vapor is condensed on the surface of the filaments of the cord while interacting therewith.

* * * * *